(12) United States Patent
Pape

(10) Patent No.: US 7,945,159 B2
(45) Date of Patent: May 17, 2011

(54) DIAGNOSTIC METHOD AND DIAGNOSTIC CHIP FOR DETERMINING THE BANDWIDTH OF OPTICAL FIBERS

(75) Inventor: Andreas Pape, Brakel (DE)

(73) Assignee: Phoenix Contact GmbH & Co. KG (DE)

( * ) Notice: Subject to any disclaimer, the term of this patent is extended or adjusted under 35 U.S.C. 154(b) by 728 days.

(21) Appl. No.: 11/851,355

(22) Filed: Sep. 6, 2007

(65) Prior Publication Data

US 2008/0063408 A1 Mar. 13, 2008

(30) Foreign Application Priority Data

Sep. 7, 2006 (DE) .......................... 10 2006 042 525

(51) Int. Cl.
*H04B 10/08* (2006.01)
(52) U.S. Cl. ................ 398/28; 398/33; 398/38; 398/25
(58) Field of Classification Search ...................... 398/28
See application file for complete search history.

(56) References Cited

U.S. PATENT DOCUMENTS

| 4,280,765 | A | * | 7/1981 | Pophillat et al. | ............. | 356/73.1 |
| 4,637,072 | A | * | 1/1987 | Hellstrom | ........................ | 398/29 |
| 4,768,854 | A | * | 9/1988 | Campbell et al. | ............... | 385/32 |

(Continued)

FOREIGN PATENT DOCUMENTS

DE 32 00 825 C2 7/1983

(Continued)

OTHER PUBLICATIONS

Bonek. ("How to Measure Transmission Properties of Optical Fiber Systems", Elektrotechnik and informationstechnik, springer verlag, wien, at, Bd. 105, Nr. 10, Oct. 1, 1988).*

(Continued)

*Primary Examiner* — Ken N Vanderpuye
*Assistant Examiner* — Danny W Leung
(74) *Attorney, Agent, or Firm* — DeMont & Breyer LLC

(57) ABSTRACT

The present invention provides a method for determining the bandwidths of optical fibers, wherein the method provides the coupling of light with a first optical power and a first modulation frequency into an optical fiber, as well as measuring a first signal level as a function of the optical power of the light of the first modulation frequency, coupling light with the second optical power and a second modulation frequency into the optical fiber, measuring a second signal level as a function of the optical power of the light of the second modulation frequency, and determining the bandwidths of the optical fibers as a function of the first and second coupled optical [power and/or] the measured first and second signal levels while using a predetermined specification that describes the frequency-dependent attenuation response of the optical fiber, wherein the first and the second modulation frequencies have essentially the same value.

25 Claims, 2 Drawing Sheets

U.S. PATENT DOCUMENTS

| | | | | |
|---|---|---|---|---|
| 4,804,248 | A * | 2/1989 | Bhagavatula | 385/28 |
| 4,921,347 | A * | 5/1990 | Wong et al. | 356/73.1 |
| 4,990,770 | A * | 2/1991 | Hemmann et al. | 250/227.24 |
| 5,029,174 | A * | 7/1991 | Anderson et al. | 372/32 |
| 5,196,899 | A * | 3/1993 | Serwatka | 356/73.1 |
| 6,353,494 | B1 * | 3/2002 | Hamada | 359/322 |
| 6,400,450 | B1 * | 6/2002 | Golowich et al. | 356/73.1 |
| 6,504,849 | B1 * | 1/2003 | Wang et al. | 370/455 |
| 6,788,397 | B1 * | 9/2004 | Golowich et al. | 356/121 |
| 6,801,306 | B2 * | 10/2004 | Fontaine | 356/73.1 |
| 6,885,683 | B1 * | 4/2005 | Fermann et al. | 372/25 |
| 6,924,890 | B1 * | 8/2005 | Vobian et al. | 356/73 |
| 7,508,523 | B2 * | 3/2009 | Chang et al. | 356/479 |
| 7,659,969 | B2 * | 2/2010 | Behr et al. | 356/73.1 |
| 2003/0039211 | A1 * | 2/2003 | Hvostov et al. | 370/230 |
| 2006/0222370 | A1 * | 10/2006 | DeCusatis et al. | 398/135 |
| 2007/0065148 | A1 * | 3/2007 | Behr et al. | 398/38 |
| 2008/0063408 | A1 * | 3/2008 | Pape | 398/141 |

FOREIGN PATENT DOCUMENTS

| | | |
|---|---|---|
| DE | 42 17 899 C2 | 12/1993 |
| EP | 0 140 853 B1 | 5/1985 |
| EP | 1 018 642 A2 | 12/2000 |
| EP | 1 703 650 A1 | 9/2006 |
| WO | 00/62033 A1 | 10/2000 |

OTHER PUBLICATIONS

SSF Committee ("Specification for Diagnostic monitoring Interface for Optical Xcvrs", Aug. 1, 2002).*

Cox, C.H., II ; Betts, G.E. ; Yee, A.C. ; "Incrementally lossless, broad-bandwidth analog fiber-optic link", Broadband Analog Optoelectronics: Devices and Systems, 1990. Conference Digest., LEOS Summer Topical on Jul. 23-25, 1990 On p. 15.*

Hans-Georg Unger, "Optische Nachrichtentechnik", Dec. 1991, Huethig Buch Verlag, Heidelberg, Germany.

* cited by examiner

DIAGNOSTIC METHOD AND DIAGNOSTIC CHIP FOR DETERMINING THE BANDWIDTH OF OPTICAL FIBERS

FIELD OF THE INVENTION

The invention relates, in general, to optical data transmission, and in particular, to a method and to a device for the diagnosis of optical fibers.

BACKGROUND OF THE INVENTION

For backbone cabling and also in connection with Fast-Ethernet and Gigabit-Ethernet, cabling based on optical cables is becoming increasingly more interesting. The signal transmission in optical fibers, also designated as optical waveguides (LWL), is realized via light pulses unidirectionally, i.e., only in one direction, which is why typically at least two optical fibers are used per cable. The light pulses are usually coupled into the fiber by means of a laser diode or a light-emitting diode.

The advantages of optical data transmission consist in the high achievable transmission rates and the large range, as well as in the insensitivity relative to electromagnetic radiation, the protection against eavesdropping, and the resistance to heat and weather effects. Because of the thin inner conductor, optical cables also can have a flexible layout.

In addition to pure glass fibers, optical fibers made from polymers have found a large distribution due to their lower costs. Optical fibers made from polymers are designated as POF fibers (Plastic Optical Fibers) and are pure plastic fibers, which are composed of a transparent core and cladding, wherein the cladding has a lower index of refraction than the core material. Polymers, such as polymethyl methacrylate or polycarbonate, are used as the core material. In addition to the pure polymer fibers, the polymer optical fibers also include hybrid fibers, which consist of a combination of glass fiber and plastic cladding, for example, HCS fibers (Hard Polymer Cladded Silica).

The range that can be directly bridged with optical waveguides is limited by various dispersion and scattering effects. It is dependent on the bandwidth to be transferred and is typically specified as a bandwidth-length product. Relative to glass fibers, polymer fibers, such as POF or HCS have significantly higher attenuation values. POF or HCS fiber systems are operated at path lengths of 50 or 100 in and data rates of 100 Mbps or 125 MBd, which is already at the limits of their technical possibilities. To guarantee reliable data transmission, a diagnosis of the optical fibers of the transmission path is currently a routine procedure.

A method for the diagnosis of optical light waveguide paths, especially for optical diagnosis with an Interbus system, is known, for example, from DE 42 17 899 C2. The method described there is used for optimizing the system of LWL transmission paths during commissioning, and changes the optical transmission power of a transceiver until the optical signal received on the opposite side corresponds to the system requirements.

From EP 1 227 604 A2 a method is known in which an optical transmission path's actual current level reserve is determined relative to the sensitivity limit, that is, one between the current transmission power of the transmission and the current sensitivity limit of the receiver.

The optical diagnosis according to the state of the art has the goal of diagnosing the attenuation of optical connection paths in order to deduce reliable transmission. This is also sufficient for low bit rate systems. For data rates above 100 Mbps, however, in polymer (POF) and HCS fibers, the limiting factor for error-free transmission is no longer the cable attenuation, but instead the bandwidth of the cable. This, however, cannot be automatically tested by the methods known today. Another disadvantage of known systems lies in that the fiber type that is used, such as POF or HCS, which cannot be operated on the same interface, cannot be determined automatically. This also has a disadvantageous effect on the attenuation diagnosis, because different fiber types also have a different attenuation response and thus the diagnostic data must be evaluated differently. Typically, today the fiber type must be specified by hand in the diagnostic software.

SUMMARY OF THE INVENTION

The German Patent Application No. 10 2005 016. 522.2 filed on Apr. 18, 2005 by the same applicant as the present invention, wherein the present invention represents a refinement of this prior application, is based on the task of presenting a way for the diagnosis of optical fibers or cables to be improved and/or simplified. In particular, the task consisted in specifying a method and a device for the simple and economical bandwidth determination of optical fibers, as well as a path for system optimization of optical data transmission paths.

For this purpose, a method for determining the bandwidth of at least one optical fiber was proposed with the steps of coupling light with a first optical power and a first modulation frequency into the optical fiber, measuring a first signal level as a function of the optical power of the light of the first modulation frequency guided through the optical fiber, coupling light with a second optical power and a second modulation frequency into the optical fiber, measuring a second signal level as a function of the optical power of the light of the second modulation frequency guided through the optical fiber, and determining the bandwidth of the optical fiber as a function of the first and second coupled optical power and/or the measured first and second signal level using a predetermined specification that describes the frequency-dependent attenuation response of the optical fiber.

Unless specified otherwise below, the term frequency is used in the sense of a modulation frequency of an optical signal.

The principle of the method according to the German Patent Application No. 10 2005 016 522.2 was essentially to determine the attenuation of two optical signals of different frequency and from this to determine the bandwidth of the optical fiber with reference to a previously known characteristic frequency response of the attenuation of the optical fiber.

Attenuation is understood to be the losses of the light passing through an optical fiber. The attenuation is typically expressed as ten times the logarithm of the ratio of the optical power at the input and output of the optical fiber:

$$A = 10 \cdot \log \frac{P_{input}}{P_{output}} [dB] \quad (1)$$

The attenuation is caused mainly by the physical processes of absorption and scattering, as well as through mechanical bending.

For optical fibers exhibiting low-pass characteristics, the bandwidth corresponds to the modulation frequency at which the optical power has fallen optically by 50% or 3 dB compared with the value at the zero frequency.

To increase the accuracy of the method according to the German Patent Application No. 10 2005 016 522.2, the signals of the first and second frequencies advantageously exhibit a very different frequency-dependent attenuation.

Advantageously, it was provided for the first frequency to be smaller, especially at least by the factor 10, particularly at least by the factor 100, than the bandwidth of the optical fiber and for the frequency-dependent attenuation of the optical fiber at the first frequency to be essentially zero, because under this precondition, the computational specifications for determining the bandwidth are significantly simplified.

The second frequency advantageously lay in the region of the bandwidth of the optical fiber, wherein the second frequency usefully lay in the region of the ideal, expected bandwidth of the optical fiber and thus typically above the real bandwidth, so that the signal of the second frequency experiences a stronger attenuation than the signal of the first frequency. In particular, the optical fiber had a frequency-dependent attenuation for continuous light of the second frequency, which lies between 1 and 5 dB, especially between 2 and 4 dB, particularly approximately 3 dB, above the frequency-dependent attenuation for continuous light of the first frequency.

The basic concept of the invention according to the German Patent Application No. 10 2005 016 522.2 consisted in determining the bandwidth of an optical fiber through two measurement values, a first measurement value that is used for reference and that is essentially uninfluenced by the bandwidth limitation of the optical fiber, and a second, bandwidth-dependent measurement value. Determining the bandwidth from these two measurement values is enabled through the use of a predetermined specification that describes the frequency-dependent attenuation response of the optical fiber.

The task of measuring the bandwidth of an optical connection between two terminals is achieved by the German Patent Application No. 10 2005 016 522.2 such that the optical power measurements necessary for determining the bandwidth are performed at two different frequencies or data rates, because one measurement at a lower frequency is performed as a reference measurement. For solutions in the German Patent Application No. 10 2005 016 522.2, these are typically 10 and 100 Mbps for POF and HCS fibers. Thus, in an especially simple way, a bandwidth measurement was already advantageously allowed with the help of a standard Ethernet device.

Switching the data rate is necessarily always connected with a break in the link, which leads to at least a temporary loss of data communications, so that the method described in the German Patent Application No. 10 2005 016 522.2 typically cannot be performed online during ongoing communications operation of an LWL interface.

Thus, the present invention is based on the task of refining the subject matter of the German Patent Application No. 10 2005 016 522.2, such that the diagnosis of optical fibers or cables can be further simplified. In particular, the task consists in specifying a method and a device for the simple and economical bandwidth determination of optical fibers, by means of which a bandwidth measurement can also be performed online without affecting communications.

According to the invention, the first and second modulation frequencies have essentially the same value, so that the first and second signal levels are determined at essentially the same modulation frequency. According to the present invention, the measurement value used as a reference is determined at the same modulation frequency at which the bandwidth-dependent measurement value is also determined.

Advantageously, in turn, the first optical power of the coupled light of the first modulation frequency and the second optical power of the coupled light of the second modulation frequency have predetermined values that are, especially preferably, essentially the same.

Surprisingly the inventors have discovered that for the same input power of the coupled light of the first and second modulation frequencies and for a predetermined specification for describing the frequency-dependent attenuation response of the fiber, the bandwidth can be determined from the ratio of the measured first and second signal levels also when the first and second modulation frequencies are essentially the same. According to the invention, the coupled light of the first and second modulation frequencies is advantageously identical and the bandwidth measurement is based on the different type of measured signal level.

Alternatively, it is advantageously provided, in turn, to detect the exceeded specified thresholds. Accordingly, advantageously the first optical power of the coupled light of the first modulation frequency is varied until the measured first signal level reaches a predetermined first threshold and the second optical power of the coupled light of the second modulation frequency is varied until the measured second signal level reaches a predetermined second threshold.

Advantageously, the first threshold for the first modulation frequency and the second threshold for the second modulation frequency are the same, so that in a simple way the bandwidth of the fiber can be determined from the relevant optical input powers or the proportional magnitudes.

The one or more optical fibers preferably comprise a polymer and/or a glass and are constructed especially as POF or HCS fibers. Pure glass fibers, however, also lie within the scope of the invention.

An advantageous specification that describes the frequency-dependent attenuation response of an optical fiber, especially a POF or HCS fiber, is a Gaussian low-pass function, which is defined by the equation $$P(f) = P_0 \cdot \exp\left(-\frac{f^2}{f_0^2}\right) \quad (2)$$

In an especially preferred embodiment of the invention, the measurement of the first signal level comprises determining a mean or averaged optical power (AVG). This measurement value is essentially independent of bandwidth effects and is therefore used as a reference value.

Measuring the second signal level comprises, in an especially preferred way, determining the amplitude of the modulated optical signal according to the OMA method (Optical Modulated Amplitude), because the amplitude of the modulated optical signal is influenced by the bandwidth of the optical fiber.

The use of the different optical power measurement methods AVG and OMA allows a bandwidth determination of the optical fiber with reference to measurement values that are determined at only one modulation frequency or data rate.

Thus, the essentially equal first and second modulation frequencies lie preferably approximately at the bandwidth of the optical fiber. Advantageously, it can also lie in the region of the ideal, expected bandwidth of the optical fiber and thus typically above the real bandwidth.

This preferred embodiment of the present invention thus touches on the knowledge that when the theoretical bandwidth response of an LWL connection or an optical fiber is known and the peak-to-peak or OMA value of the LWL optical power, as well as the average optical power (AVG) are detected at a fixed data rate or modulation frequency, the 3 dB bandwidth can also be determined for only one data rate or modulation frequency. Thus, the method according to the invention can also be performed online without affecting the communications of an optical communications connection.

This rests essentially on the fact that the average optical power is independent of the bandwidth effects on the optical signals by the cable or the optical fiber, while the peak-to-peak value, that is, the amplitude of the modulated optical signal, is influenced very much by the bandwidth of the cable. Expressed simply, the measurement of the average optical power AVG has the function of a reference measurement similar to the measurement of the optical power at the lower modulation frequency according to the method already described in the German Patent Application No. 10 2005 016 522.2.

Advantageously, the measurement of the first and/or second signal level is performed by means of an optical transceiver, which has a DMI interface (Diagnostic Monitoring Interface) according to SFF-8472, because this is advantageously constructed to measure the average light output (AVG) and the amplitude of the modulated optical signal (OMA).

The DMI interface (Diagnostic Monitoring Interface) is an expanded serial interface, which allows access to certain operating parameters of an optical transceiver for diagnostic purposes. These operating parameters include, for example, the temperature of the transceiver, the output power, and also, in particular, the optical power received by the transceiver.

Advantageously, an optical transceiver can also be provided on the receiver side with which the received optical power is not determined directly, but instead only allows detecting thresholds for a certain optical power. Such a transceiver can be constructed more easily and thus more economically. The detection of thresholds for a certain optical power is converted from PSM, for example, for PSI-MOS devices.

Determining the bandwidth is realized in the embodiment based on the detection of thresholds in nearly the same way as in the embodiment based on the precise measurement of the received optical power. For this purpose, the optical transmission power of the light of the first and second modulation frequencies is varied precisely as much as possible, while on the reception side, the reaching of a predetermined threshold of the received optical power is monitored. This is realized in many cases technically more easily than performing a precise optical power measurement. Preferably, the measurement of the received optical power includes the measurement of the AVG and the OMA optical power, wherein different thresholds can be provided for the AVG and the OMA optical power.

To determine the bandwidth for a given data rate or modulation frequency that simultaneously corresponds to the first and the second modulation frequencies, the optical power of the transmitter is adjusted until the predetermined thresholds are reached at the receiver.

The described embodiment, based on the effect of the transmission power, is also usually easier to realize technically in this respect than a rather exact linear relationship between the transmission power and the transmitter current for LEDs and lasers, and it is technically easier to set currents in the range from approximately 1 to 100 mA precisely than to measure optical powers at the receiver, since these measurements typically involve the evaluation of diode currents in the range of $\mu A$ or smaller.

In an especially preferred way, the measurement of the first and second signal level is performed, for example with the help of the DMI interface of a transceiver, for coupled signals that have a continuous "10"-bit pattern, such as that available with the IDLE signal of a network, e.g., 10 Base-FL or 100 Base-FX.

The method according to the invention further advantageously includes the steps of determining the length of the optical fiber by means of a propagation measurement and determining the bandwidth-length product of the optical fiber from the determined bandwidth and the determined length of the optical fiber.

The fiber type of the optical fiber can then be determined in an especially advantageous way as a function of the bandwidth-length product by means of stored value ranges of the bandwidth-length product for different fiber types.

The invention further provides a method for establishing a connection for data communications between a first and a second terminal that are connected to each other by means of an optical data transmission path with at least one optical fiber, which advantageously provided an initialization phase within which the bandwidth of the optical fiber is determined according to the method described above for determining the bandwidth of an optical fiber.

Advantageously, the optical data transmission path comprises a first optical transceiver at the first path end and a second optical transceiver at the second path end, which are connected to each other via a first and a second optical fiber for the two transmission directions. For this arrangement, the method preferably provides for the determination of the bandwidth of the first and the second optical fiber. Determining the bandwidth of the first and the second optical fiber can be performed one after the other or in parallel.

Determining the bandwidth is used, in particular, for diagnosing the present bandwidth limits, which have an effect on the maximum possible data transmission rate. Accordingly, the method advantageously provides the step of automatically adjusting the transmission rate of the data communications as a function of the determined bandwidth of the one or more optical fibers.

Because, in an especially advantageous way, determining the bandwidth is made possible by the present invention without switching the data rate, furthermore a method is provided for data communications between a first and a second terminal that are connected by means of an optical data transmission path with at least one optical fiber, in which the bandwidth is determined in the way described above, that is, for an existing communication connection between the first and the second terminals.

An electronic component for use in an optical data transmission path with at least one optical fiber, which is constructed especially as an integrated circuit and which is suitable for performing the method described above for determining the bandwidth of an optical fiber, comprises means according to the invention for calculating a value for the bandwidth of an optical fiber as a function of a first and a second signal level using an algorithm which is based on a predetermined specification, wherein the specification describes the frequency-dependent attenuation response of the optical fiber, and is further constructed for measuring the average optical power (AVG) of an optical signal and the amplitude of a modulated optical signal (OMA; Optical Modulated Amplitude).

The first or second signal level is preferably proportional to a first or second optical power measurement quantity, each of which is obtained by means of a first or second optical power measurement method from light is coupled with a given modulation frequency into the optical fiber and is received after passing through the optical fiber, wherein the first optical power measurement method includes the determination of the averaged optical power of the received light and the second optical power measurement method includes the determination of the amplitude of the received modulated optical signal.

The invention is described in more detail below with reference to preferred embodiments and with reference to the attached drawings. Here, the same reference symbols in the drawings designate the same or similar parts.

BRIEF DESCRIPTION OF THE DRAWINGS

Shown are.

DETAILED DESCRIPTION

Figure 1:
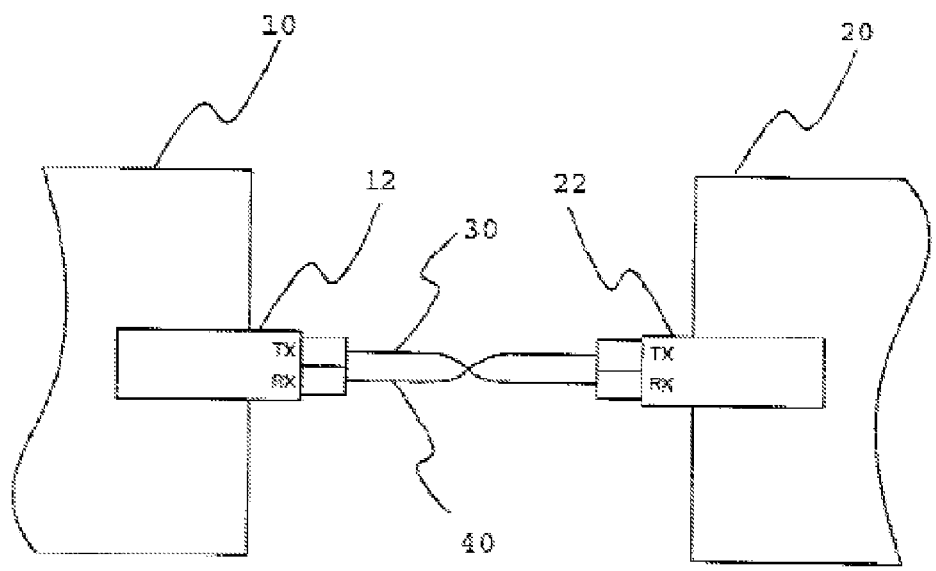
FIG. 1, schematically an optical transmission path with two optical transceivers, which are connected to each other via two optical fibers, FIG. 2, a schematic representation of a preferred embodiment of an electronic component according to the invention, FIG. 3, a schematic diagram of the frequency-dependent attenuation response of a POF fiber, and FIG. 4, schematically the time profile of an optical signal in an optical waveguide (LWL) or an optical fiber for illustrating a preferred embodiment of the present invention.

FIG. 1 shows an optical data, transmission path between a first terminal 10 and a second terminal 20. The terminals 10 and 20 are equipped with a first optical transceiver 12 and a second optical transceiver 22, respectively, which are connected to each other via a duplex-LWL line with a first optical fiber 30 and a second optical fiber 40 for the two respective data directions.

In this embodiment, POF fibers are used as the optical fibers and the bandwidth test according to the invention is performed before establishing the connection as an initialization of the interfaces. Because a determination of the bandwidth is made possible by the present invention in an especially advantageous way without switching the data rate, the bandwidth test according to the invention can alternatively also be performed after establishing the connection. Furthermore, it can be advantageous to repeat the bandwidth test according to the invention at given time intervals.

Below, the basic bandwidth determination procedure according to the German Patent Application No. 10 2005 016 522.2 will be described. First, the transceiver 12 sends a signal with a predetermined optical power and with a first frequency, which in this embodiment typically lies below 10 MHz, and the transceiver 22 measures the OMA optical power of the received signal. Then the transceiver 12 sends a signal of the same optical power but with a second frequency, which in this embodiment typically lies between 60 and 100 MHz, and the transceiver 22 again measures the OMA optical power of the received signal. In parallel, the second fiber of the duplex-LWL line is measured in the same way while exchanging the roles of transceiver 12 and 22. The received optical power of the second signal is lower than that of the first signal as a function of the cable length, the light coupling (coupling NA) into the fiber, and possible bends or damage to the fiber. For a Fast-Ethernet system, if this difference is greater than 3 dB then transmission problems due to bandwidth limitations are assumed. In this case, a corresponding warning message can be generated or the data transmission rate can be adjusted automatically.

As an alternative to the precise measurement of the received light output, the transmission power can also be varied, as described above, for a first and a second frequency until a given threshold for the received optical power is detected on the reception side.

In addition, the path length of the optical transmission path between terminals 10 and 20 can be determined by means of a propagation time measurement, in the case of Profinet, for example, by means of the propagation time measurement for clock synchronization. Then the determined bandwidth can also be set and evaluated in relation to the cable length. The automatic determination of the fiber type is thus possible, because, for example, a POF fiber has a different bandwidth-length product than an HCS fiber.

The method according to the invention can also be used for Gbit transceivers and multimode glass fibers (50/135 µm, 62.5/125 µm), because also in this case the possible transmission distance between two transceivers is bandwidth-limited. There the frequencies are to be adapted to the ratios in the glass fibers.

Figure 2:
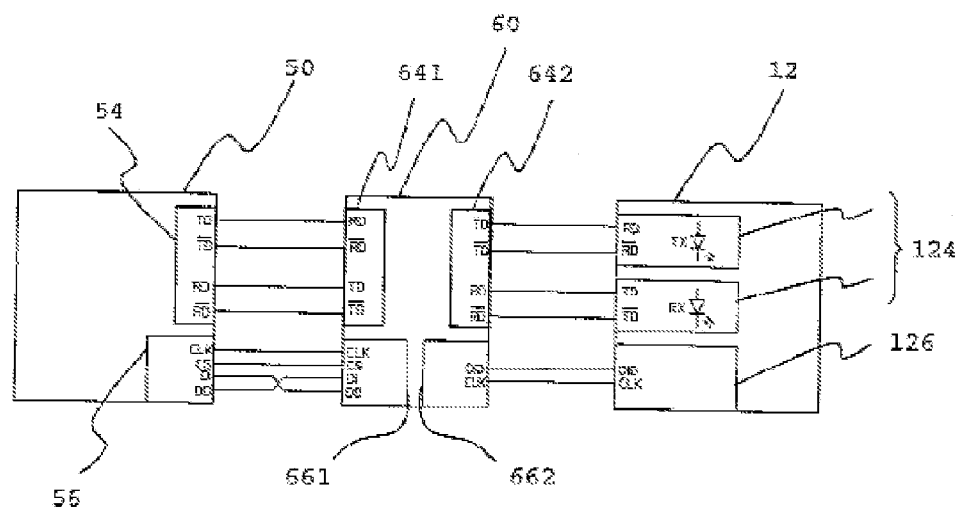

FIG. 2 shows a schematic representation of a preferred embodiment of an electronic component 60 according to the invention, which is constructed as a separate diagnostic chip. The diagnostic chip 60 is connected in the data path between a PHY transceiver 50 assigned to the physical layer of a network and an optical LWL transceiver 12. For data communications, first and second interfaces 641 and 642 are provided in component 60, by means of which the PECL interface 124 of the LWL transceiver 12 is connected to the PECL interface 54 of the PHY transceiver 50. Therefore, in the case of normal Ethernet communications, the component 60 constructed as a separate diagnostic chip is transparent for the Ethernet data signals.

The component 60 further comprises, especially for monitoring the received optical power, a first serial interface 622 for connecting to a DMI interface 126 of the optical transceiver 12. In addition, a second serial interface 661 is provided for connecting to a serial interface 56 of the PHY transceiver 50.

In this embodiment, the interfaces 126 and 662 use the I²C transmission protocol and the interfaces 56 and 661 use the SPI transmission protocol. A corresponding, not-shown converter is integrated into the component 60 for converting between these two transmission protocols.

The invention can be used advantageously in all optical interfaces for Fast-Ethernet devices with POF and HCS fiber interfaces, as well as for glass-fiber interfaces, which are of interest, in particular, for systems with data transmission rates of 10 Gbps.

Especially for Profinet interfaces, the method offers additional advantages relative to conventional diagnostic systems because it does not directly involve the LWL transceiver that is used, but instead is a digital method. The prerequisite is only that the LWL transceiver to be used has a DMI interface according to SFF-8472 and measures the AC component of the optical power according to the OMA method (Optical Modulated Amplitude) described there, as well as the averaged optical power according to the AVG method described there. For calculating the bandwidth from the values determined by means of a transceiver and ruled by two different optical power measurement methods OMA and AVG, an evaluating unit is advantageously used that is constructed, for example, as a processor of an Ethernet device.

In principle, the method according to the German Patent Application No. 10 2005 016 522.2 involves performing two attenuation measurements for two different frequencies, for example, with the help of the DMI interface of an optical transceiver. In an especially simple way, the signals of different frequencies can be represented by a continuous "10"-bit pattern with corresponding frequency. Especially advantageously, the IDLE signal of a network can be used for this purpose.

Below, an actual example of the bandwidth determination according to the German Patent Application No. 10 2005 016 522.2 is described with reference to FIG. 3. The signals of the first and second frequencies are here formed by means of an IDLE signal according to 10 Base-FL for the first frequency and by means of an IDLE signal according to 100 Base-FX for the second frequency. The IDLE signal according to 10 Base-FL has a frequency of 0.5 MHz, which is given from alternating "light on" and "light off" signals each of 1 μS duration. The IDLE signal according to 100 Base-FX has a frequency of 62.5 MHz, which is produced from the data rate of 100 Mbps, the 4B/5B coding, and a change in the NRZI code per bit time of the IDLE signal.

Accordingly, the first measurement takes place at a frequency of 0.5 MHz, which lies far below the bandwidth 84 of the POF fiber used in this embodiment of approximately 90 MHz. For this purpose, the transmitter of the first transceiver is excited at this frequency and the averaged optical power coming into the receiver of the second transceiver is determined by means of its DMI interface. At this frequency there is no frequency-dependent attenuation, and the received optical power has the level designated in FIG. 3 with the reference symbol 72.

Figure 3:
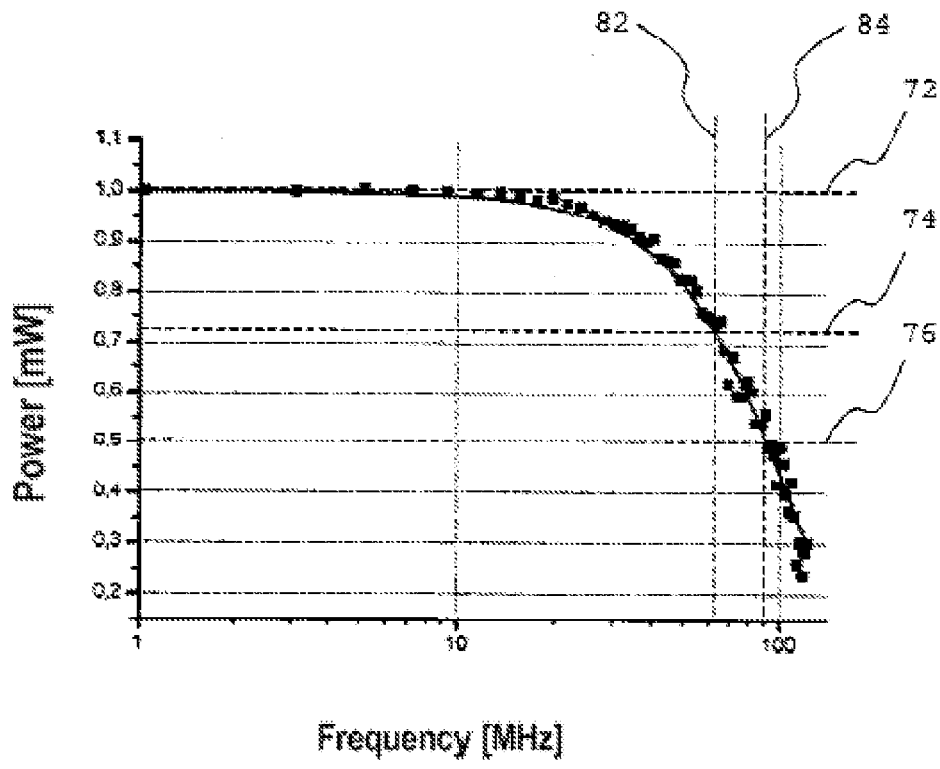

Then a second measurement is performed with the frequency 62.5 MHz, provided in FIG. 3 with the reference symbol 82, which lies on the order of magnitude of the bandwidth 84 of 90 MHz of the fiber to be measured, at which the received light output 76 drops to half relative to the frequency of zero.

Due to the low-pass characteristics of the fiber, this second determined optical power 74 is smaller than the first 72. According to the invention, the bandwidth of the connection can now be determined from the known low-pass characteristics of the LWL fiber that is used, and also the fiber type can be determined by means of an automatic path length measurement.

For this purpose, a Gaussian low-pass function according to the equation $$P(f) = P_0 \cdot \exp\left(-\frac{f^2}{f_0^2}\right) \quad (2)$$

is used as the specification describing the frequency-dependent attenuation response of the fiber.

In this embodiment, the received optical power is measured via the DMI interface as an electrical signal level, producing the following measurement values:*

* [Note: In German, commas between numbers signify decimal points.]

$$U(0,5 \text{ MHz}) = 452 \text{ mV} = U_0$$

$$U(62,5 \text{ MHz}) = 324 \text{ mV}$$

$$\Rightarrow \frac{U}{U_0} = 0{,}72$$

Because the signal level determined by means of the OMA method and delivered by the DMI interface is proportional to the received optical power, the following is produced from the above equation (2)

$$U(f) = U_0 \cdot \exp\left(-\frac{f^2}{f_0^2}\right); \quad (3)$$

with:

$$U_0 = U(0,5 \text{ MHz})$$

$$\Rightarrow f_o = \sqrt{-\frac{(62,5 \text{ MHz})^2}{\ln\left(\frac{U}{U_0}\right)}} = 109{,}05 \text{ MHz} \quad (4)$$

From this, the bandwidth of the optical fiber can be calculated with $$f_{3dB} = \sqrt{-\ln(0.5)} \cdot f_0 = 90.8 \text{MHz}$$

In an analogous way, the bandwidth of the optical fiber can be calculated if the transmission power is varied until the received optical power reaches a predetermined threshold, wherein the threshold for both frequencies is the same.

For this variant, the following is produced $$f_0 = \sqrt{-\frac{(f_2)^2}{\ln\left(\frac{P_{0;f_1}}{P_{0;f_2}}\right)}} = \sqrt{-\frac{(62,5 \text{ MHz})^2}{\ln\left(\frac{P_{0;0,5 \text{ MHz}}}{P_{0;52,5 \text{ MHz}}}\right)}} \quad (5)$$

with
$P_{0;f1}$: the optical transmission power for reaching the threshold for the first frequency, and
$P_{0;f2}$: the optical transmission power for reaching the threshold for the second frequency.

For a linear relationship between the transmitter current I of the LED used for transmission or the laser used for transmission and the coupled optical power, the following is produced $$f_0 = \sqrt{-\frac{(f_2)^2}{\ln\left(\frac{I_{0;f_1}}{I_{0;f_2}}\right)}} \quad (6)$$

with
$I_{0;f1}$: the transmitter current for reaching the threshold for the first frequency, and
$I_{0;f2}$: the transmitter current for reaching the threshold for the second frequency.

In the following it will be described, with reference to FIG. 4, how according to an especially preferred embodiment of the present invention the bandwidth of an LWL connection can be calculated from the average optical power (AVG) and the peak-to-peak optical power, i.e., the amplitude of the modulated signal (OMA), for a known physical response of the LWL fiber that is used, wherein in this embodiment polymer fibers are provided as LWL fibers or optical fibers. The terms cable and fiber are used essentially synonymously below, and in general designate an optical fiber.

Figure 4:
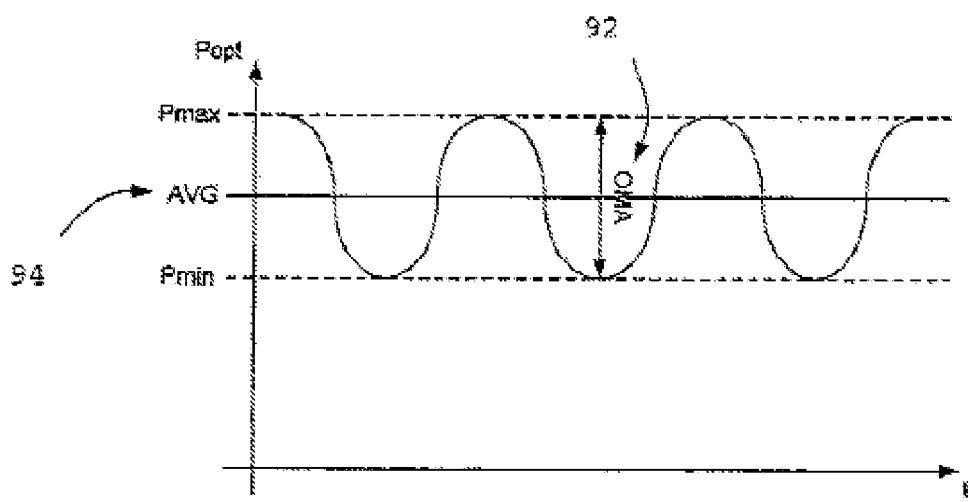

In FIG. 4, the time profile of an optical signal in an optical waveguide (LWL) is shown, wherein the optical power $P_{opt}$ is plotted versus time t. The signal has a high DC component for a small modulated signal amplitude OMA 92, wherein the value for the modulated signal amplitude OMA 92 is given from the difference between the maximum optical power $P_{max}$ and the minimum optical power $P_{min}$. Such relationships are typical in the region of the bandwidth limit of an optical transmission path.

For a polymer fiber it is known that the fiber behaves like a Gaussian low-pass filter. Therefore, the signal amplitude 92 can be described by the following equation:

$$OMA = A_0(1) \cdot \exp\left(-\frac{f^2}{f_0^2}\right) = A(1, f) \quad (7)$$

$A_0(l)$ is the original amplitude of the optical signal at the start of the fiber, which is reduced by the normal cable attenuation after a fiber length l. Thus, the following is produced $$A_0(l) = A_0 \cdot \exp(-\alpha \cdot l).$$

Here, $A_0$ is the actually coupled amplitude and a is the absorption coefficient of the fiber.

The average optical power AVG 94 is given according to FIG. 4 as follows:

$$AVG = P_{\min}(1, f) + \frac{1}{2} \cdot A(1, f)$$

Here, $P_{min}(l,f)$ is the minimum optical power as a function of the cable length I and the transmission frequency f that is used. This value is dependent on the cable attenuation a over the cable length and dependent on the bandwidth response of the fiber that is used at the frequency f and also over the cable length I.

Now, however, the average value AVG 94 of the optical power is dependent only on the attenuation of the cable, because the bandwidth effect leads to no absorption of energy, but instead merely to a redistribution of the optical energy from the modulated light component (AC component) to the constant light component (DC component). This observation is justified by the principle of energy conservation of the optical power.

Mathematically, this means the following:

$$AVG = P_{\min,0}(1) + \frac{1}{2} \cdot A_0(1) \quad (8)$$

Equations (7) and (8) now describe a system of equations with two unknowns, namely the values $A_0(l)$ and the frequency $f_0$ to be determined, which describes the bandwidth response of the fiber. The values AVG 94 and OMA 92 are given from the measurement on the LWL transceiver that is used and $P_{min,0}(l)$ is known via the transmitter used in the transceiver. Advantageously, the transmitter used in the transceiver is fast enough that the light which is coupled at the beginning into the fiber that is used effectively emerges completely within a bit time. In this case, $P_{min,0}=0$ and thus also $P_{min,0}(l)=0$. Here, f is the frequency at which the measurements were performed. For a Fast Ethernet system with a 125 MBd symbol rate, this is typically 62.5 MHz.

Now, if the equations (7) and (8) are set one in the other and everything is rearranged according to the frequency $f_0$ to be determined, then the following is obtained:

$$f_0 = \frac{f}{\sqrt{\ln\left(2 \cdot \frac{AVG - P_{\min,0}(1)}{OMA}\right)}}$$

or for the case that $P_{min,0}(l) \approx 0$ $$f_0 = \frac{f}{\sqrt{\ln\left(2 \cdot \frac{AVG}{OMA}\right)}}$$

Typically, the frequency $f_0$ is not specified as the bandwidth of a fiber, but instead the frequency at which the amplitude is reduced by 3 dB due to the bandwidth effect. Below this is named $f_3$ dB. The relationship can be calculated simply from the Gaussian low-pass filter and yields:

$$f_{3dB} = f_0 \cdot \sqrt{\ln(2)}$$

Thus it is shown that the bandwidth [measurement] of an LWL connection can be performed online in continuous communications operation, for example, for Fast Ethernet applications with polymer fibers, through simple measurement of the average optical power AVG and the modulated signal amplitude OMA at the end of a cable path. In this case, it no longer must switch between at least two different frequencies, as was still proposed in the German Patent Application No. 10 2005 016 522.2. Therefore, this method once again represents a clear simplification of the bandwidth measurement.

The invention claimed is:

1. A method for determining the bandwidth of at least one optical fiber, comprising:
   coupling, by an electronic component, light with a first optical power and a first modulation frequency into the optical fiber;
   measuring, by the electronic component, a first signal level as a function of the optical power of the light of the first modulation frequency passing through the optical fiber;
   coupling, by the electronic component, light with a second optical power and a second modulation frequency into the optical fiber;
   measuring, by the electronic component, a second signal level as a function of the optical power of the light of the second modulation frequency passing through the optical fiber; and
   determining, by the electronic component, the bandwidth of the optical fiber as a function of the first and second optical power and/or the measured first and second signal level while using a predetermined specification that describes the frequency-dependent attenuation response of the optical fiber;
   wherein the first and second modulation frequencies have substantially the same value.

2. The method according to claim 1, wherein the first optical power of the coupled light of the first frequency and the second optical power of the coupled light of the second modulation frequency have predetermined values.

3. The method according to claim 1, wherein the first optical power of the coupled light of the first frequency and the second optical power of the coupled light of the second frequency are substantially the same.

4. The method according to claim 1, wherein
   the first optical power of the coupled light of the first frequency is varied until the measured first signal level reaches a predetermined first threshold, and
   the second optical power of the coupled light of the second frequency is varied until the measured second signal reaches a predetermined second threshold.

5. The method according to claim 4, wherein the first and second thresholds are substantially the same.

6. The method according to claim 1, wherein the predetermined specification that describes the frequency-dependent attenuation response of the optical fiber, is a Gaussian low-pass function.

7. The method according to claim 1, wherein the one or more optical fibers are composed of a polymer and/or a glass, constructed from POF or HCS fibers.

8. The method according to claim 1, wherein the first and second modulation frequencies lie approximately at the bandwidth of the optical fiber.

9. The method according to claim 1, wherein the first and second modulation frequencies lie above the bandwidth of the optical fiber.

10. The method according to claim 1, wherein the measuring of the first signal level includes the determination of an averaged optical power (AVG).

11. The method according to claim 1, wherein the measuring of the second signal level includes the measuring of the amplitude of the modulated optical signal according to the OMA (Optical Modulated Amplitude) method.

12. The method according to claim 1, wherein the measuring of the first and/or second signal level is performed by means of an optical transceiver that has a DMI interface (Diagnostic Monitoring Interface) according to SFF-8472.

13. The method according to claim 1, wherein the light of the first and/or second modulation frequency led through the optical fiber includes a data signal that alternately has the bit values 1 and 0.

14. The method according to claim 13, wherein the data signal is an IDLE signal according to the network standard, according to 10 Base-FL or 100 Base-FX.

15. The method according to claim 1, further comprising:
determining the length of the optical fiber by means of a propagation time measurement; and
determining the bandwidth-length product of the optical fiber from the determined bandwidth and the determined length of the optical fiber.

16. The method according to claim 15, further comprising:
determining the fiber type of the optical fiber as a function of the bandwidth-length product by means of stored value ranges of the bandwidth-length product for at least two different fiber types.

17. A method for establishing a connection for data communications between a first and a second terminal that are connected to each other by means of an optical data transmission path with at least one optical fiber, comprising an initialization of the connection wherein the initialization includes the determining of the bandwidth of the one or more optical fibers according to claim 1.

18. The method according to claim 17, wherein the optical data transmission path comprises a first optical transceiver at the first path end and a second optical transceiver at the second path end, which are connected to each other via a first and a second optical fiber for the two transmission directions, and wherein the bandwidth of the first and the second optical fibers is determined.

19. The method according to claim 18, wherein the bandwidths of the first and the second optical fibers are determined one after the other.

20. The method according to claim 18, wherein the bandwidths of the first and second optical fibers are determined substantially simultaneously.

21. The method according to claim 17, wherein the initialization of the connection includes the step of automatically adjusting the transmission rate of the data communications as a function of the determined bandwidth of the one or more optical fibers.

22. A method for data communications between a first and a second terminal that are connected to each other by means of an optical data transmission path with at least one optical fiber, including the determination of the bandwidths of the one or more optical fibers according to claim 1 for an existing communications connection between the first and second terminals.

23. The method according to claim 22, wherein the determination of the bandwidths of the one or more optical fibers is repeated at given time intervals.

24. An electronic component for use in an optical data transmission path that has at least one optical fiber, the electronic component comprising:
means for calculating a value for the bandwidth of an optical fiber as a function of a first and a second signal level while using an algorithm based on a predetermined specification where the specification describes the frequency-dependent attenuation response of the optical fiber; and
means for measuring the average optical power (AVG) of an optical signal and the amplitude of a modulated optical signal (OMA; Optical Modulated Amplitude), resulting in values for the first signal level and second signal level, respectively.

25. An electronic component for use in an optical data transmission path that has at least one optical fiber and an optical transceiver, the electronic component comprising:
a serial interface for connecting to a DMI interface of the optical transceiver for receiving values of a first signal level and a second signal level that are determined by means of the optical transceiver by measuring the average optical power (AVG) of an optical signal and the amplitude of a modulated optical signal (OMA; Optical Modulated Amplitude), respectively; and
an evaluating unit for calculating a value for the bandwidth of the optical fiber as a function of the received values of the first signal level and the second signal level while using an algorithm based on a predetermined specification where the specification describes the frequency-dependent attenuation response of the optical fiber.

* * * * *